(12) United States Patent
Fuglsang et al.

(10) Patent No.: US 8,550,787 B2
(45) Date of Patent: Oct. 8, 2013

(54) WIND TURBINE BLADE WITH SUBMERGED BOUNDARY LAYER CONTROL MEANS COMPRISING CROSSING SUB-CHANNELS

(75) Inventors: Peter Fuglsang, Vejle (DK); Stefano Bove, Lunderskov (DK)

(73) Assignee: LM Glasfiber A/S, Kolding (DK)

( * ) Notice: Subject to any disclaimer, the term of this patent is extended or adjusted under 35 U.S.C. 154(b) by 700 days.

(21) Appl. No.: 12/733,410

(22) PCT Filed: Aug. 29, 2008

(86) PCT No.: PCT/DK2008/000310
§ 371 (c)(1),
(2), (4) Date: Jun. 29, 2010

(87) PCT Pub. No.: WO2009/026926
PCT Pub. Date: Mar. 5, 2009

(65) Prior Publication Data
US 2010/0260614 A1   Oct. 14, 2010

(30) Foreign Application Priority Data

Aug. 31, 2007  (EP) ..................................... 07388065

(51) Int. Cl.
*F03D 1/06* (2006.01)
(52) U.S. Cl.
USPC ......................... 416/235; 415/914; 416/236 R
(58) Field of Classification Search
USPC ......... 244/99.11, 199.1, 200, 200.1; 415/914; 416/235, 236 R, 237, 241 R
See application file for complete search history.

(56) References Cited

U.S. PATENT DOCUMENTS

| | | | |
|---|---|---|---|
| 2,800,291 A | | 7/1957 | Stephens |
| 4,455,045 A | | 6/1984 | Wheeler |
| 4,699,340 A | | 10/1987 | Rethorst |
| 5,114,099 A | * | 5/1992 | Gao .............................. 244/130 |
| 5,598,990 A | | 2/1997 | Farokhi et al. |
| 7,604,461 B2 | * | 10/2009 | Bonnet ......................... 416/235 |
| 2008/0175711 A1 | * | 7/2008 | Godsk et al. .................. 416/147 |

FOREIGN PATENT DOCUMENTS

| | | |
|---|---|---|
| DE | 197 38 278 A1 | 3/1999 |
| EP | 1 188 902 A1 | 3/2002 |
| FR | 2 619 069 A1 | 2/1989 |
| GB | 120741 | 11/1918 |

(Continued)

*Primary Examiner* — Edward Look
*Assistant Examiner* — Liam McDowell
(74) *Attorney, Agent, or Firm* — Nath, Goldberg & Meyer; Jerald L. Meyer; Sanjana Mangalagiri

(57) ABSTRACT

A wind turbine blade having a longitudinal direction with a root end and a tip end as well as a chord extending in a transverse direction between a leading edge and a trailing edge is described. The blade comprises a flow control surface with a suction side and a pressure side. A number of boundary layer control structures are formed in the flow control surface. The boundary layer control structures include a channel submerged in the flow control surface with a first end facing towards the leading edge and a second end facing towards the trailing edge of the blade. The channel further comprises a bottom surface extending from the first end to the second end. The channel at the first end comprises a first channel zone comprising a first sub-channel having a first cross-sectional area and a second sub-channel having a second cross-sectional area, the first sub-channel and the second sub-channel crossing each other at a point of crossing.

26 Claims, 6 Drawing Sheets

(56) References Cited

FOREIGN PATENT DOCUMENTS

| GB | 2 173 861 A | | 10/1986 |
|---|---|---|---|
| WO | WO 83/01421 | * | 4/1983 |
| WO | WO 00/15961 | A1 | 3/2000 |
| WO | WO 01/16452 | A1 | 3/2001 |
| WO | 1 091 092 | A2 | 4/2001 |
| WO | WO 02/064422 | A1 | 8/2002 |
| WO | WO 2007/035758 | A1 | 3/2007 |

* cited by examiner

WIND TURBINE BLADE WITH SUBMERGED BOUNDARY LAYER CONTROL MEANS COMPRISING CROSSING SUB-CHANNELS

This is a National Phase Application filed under 35 U.S.C. 371 as a national stage of PCT/DK2008/000310, filed Aug. 29, 2008, and claims benefit to European Patent Application No. 07388065.0, filed on Aug. 31, 2007, the content of which is hereby incorporated by reference in its entirety.

TECHNICAL FIELD

The present invention relates to a wind turbine blade having a longitudinal direction with a root end and a tip end as well as a chord extending in a transverse direction between a leading edge and a trailing edge, the blade comprising a flow control surface with a suction side and a pressure side.

BACKGROUND

There are many situations, where it is desirable to provide a method of delaying or preventing flow separation between a flowing medium and a flow control surface in regions, where the boundary layer of the flow medium due to the profile of the flow control surface is subjected to pressure gradients, which are sufficient to cause flow separation.

When a viscous fluid passes over a wind turbine blade towards the trailing edge, the fluid flows from a region with low static pressure to a region with high static pressure, in the process being subjected to an adverse pressure gradient. This results in forces, which tend to retard the boundary layer, which can be strong enough to arrest or reverse the flow, which can cause the fluid to separate and behave in a non-predictable manner. This in turn causes an increase in drag due to the cross-sectional area of separated flow in the wake of the flow control medium, which in turn reduces the lift of the wind turbine blade and even may cause the blade to stall.

It is well-known to delay or prevent flow separation by mixing free flow with the boundary layer by use of vortex generators protruding from the flow control surface, i.e. from the surface of the wind turbine blade. There is a large number of different vortex generator types, such as of the vane type, see for instance WO 01/16482, or vortex generators formed as delta shaped protrusions as shown in WO 00/15961. However, all of these vortex generators are encumbered with a drawback of relatively high drag. Furthermore, these vortex generators, which are usually mounted on the surface of the wind turbine blade after production of the blade, have a tendency to break off during transport, which may seriously impair the functionality of the blade.

U.S. Pat. No. 4,455,045 describes an alternative means to maintain a flow of a flowing medium attached to the exterior of a flow control member, where an essentially triangular shaped channel is submerged in the surface of the flow control member. The triangular shaped channel has an apex portion facing the flow of the flowing medium, and the channel emerges at the surface of this apex portion.

DISCLOSURE OF THE INVENTION

It is an object of the invention to provide a new blade for a rotor of a wind turbine, which overcomes or ameliorates at least one of the disadvantages of the prior art or which provides a useful alternative.

According to a first aspect of the invention, the object is achieved by a number of boundary layer control means being formed in the flow control surface, wherein the boundary layer control means include a channel submerged in the flow control surface with a first end facing towards the leading edge and a second end facing towards the trailing edge of the blade, the channel comprising a bottom surface extending from the first end to the second end, and wherein the channel at the first end comprises a first channel zone comprising a first sub-channel having a first cross-sectional area and a second sub-channel having a second cross-sectional area, the first sub-channel and the second sub-channel crossing each other at a point of crossing. The two crossing sub-channels each direct a separate flow having a first velocity and second velocity direction, respectively, and due to the different velocity directions of these two oncoming flows vortices are generated at the point of crossing. Such vortices will pull the boundary layer towards the flow control surface and energises the boundary layer, thereby delaying flow separation or preventing it entirely. This provides for a wind turbine blade, where detachment of the flow can be delayed towards the trailing edge of the blade or be prevented entirely. Thus, the overall lift and efficiency of the wind turbine blade can be increased. The point of crossing is located in a part of the first channel zone nearest the trailing edge of the blade, the first sub-channel and the second sub-channel thus converging towards the point of crossing.

According to a first embodiment, the channel at the second end comprises a second channel zone having a shape so that vortices generated at the point of crossing can propagate in the flow direction through the second channel zone. Thereby, the vortices can propagate in the flow direction and thereby energise and re-energise the boundary layer effectively.

In one embodiment according to the invention, the second channel zone comprises a first sidewall extending between the flow control surface and the bottom surface, and a second sidewall extending between the flow control surface and the bottom surface, wherein the first sidewall and the second sidewall are substantially parallel, for instance parallel to the transverse direction or the flow direction. Alternatively, the first sidewall and the second sidewall are diverging in the transverse direction or the flow direction. These two solutions provide simple embodiments, where the vortices can propagate in the flow direction.

According to one embodiment of the blade, the first channel zone and the second channel zone are separated by a sharp edge. That is, one sidewall of the first sub-channel continues over to the first sidewall of the second channel zone, and one sidewall of the second sub-channel continues over to the second sidewall of the second channel zone, the transverse distance between these sidewalls varying discontinuously in the flow direction.

According to a first embodiment of the sub-channels, the first cross-sectional area is substantially the same as the second cross-sectional area. According to another embodiment of the sub-channels, the first cross-sectional area is different from the second cross-sectional area. This enhances the shear stress between the two oncoming flows at the point of crossing, thereby more effectively producing flow vortices.

In one embodiment according to the invention, the second channel zone comprises a first additional sub-channel and/or a second additional sub-channel. These two additional sub-channels can also have different cross-sectional areas and can be utilised for producing new sets of vortices downstream from the point of crossing.

In another embodiment according to the invention, the first cross-sectional area and/or the second cross-sectional area is decreasing in the flow direction. This provides for a simple solution for accelerating the flows towards the point of crossing, thereby being able to produce even stronger vortices.

This can be achieved by letting sidewalls of a sub-channel being diverging in the flow direction and/or by letting the height of these sidewalls being decreasing in the flow direction.

According to advantageous embodiments, the sidewalls of the sub-channels as well as the first and the second sidewalls form sidewall edges with the flow control surface, where these edges are relatively sharp, i.e. the sidewalls and the flow control surface form angles of about 90 degrees. However, the edges need not be about 90 degrees for the vortex generating channels to function intentionally. Thus, the first sidewall and the second sidewall may also cross-sectionally diverge, so that the first sidewall edge and the second sidewall edge form angles of more than 90 degrees. Alternatively, the sidewall edges may extend beyond the flow control surface. This can for instance be implemented by forming a lip above the channel. Thereby, the channel does not have a sharp edge, thereby making it easier to mould the object with the flow control surface.

The bottom surface can also be either convex or concave in the flow direction. The bottom surface can be rounded or substantially flat, when seen in the cross-section of the channel.

The channel can also be provided with an inlet arranged before the first channel zone and/or be provided with an outlet arranged after the second channel zone. Thus, the channel can emerge at the flow control surface at the end of the inlet or at the end of the first channel zone, as well as emerge at the end of the second channel zone or at the end of the outlet. The sidewalls can be substantially parallel to the flow direction within the inlet and the outlet of the channel. The channel can also have a small discontinuity, i.e. the height of the channel or sidewalls may decrease stepwise.

According to advantageous embodiments, the first sub-channel and the second sub-channel cross each other at the point of crossing with an angle between 10 and 100 degrees, or between 20 and 95 degrees, or between 25 and 90 degrees.

Preferably, the number of means to maintain attached flow is arranged on the suction side of the blade. The means, i.e. the vortex generating channels, are typically arranged in an array in the spanwise or longitudinal direction of the blade. The means for maintaining an attached flow can also be cascaded in the chordwise or transverse direction of the blade, i.e. in the direction of the chord.

During use, the wind turbine blade is mounted to a rotor hub. The blade is typically divided into a root region with a substantially circular profile closest to the hub, an airfoil region with a lift generating profile furthest away from the hub, and a transition region between the root region and the airfoil region, the profile of the transition region gradually changing in the radial direction from the circular profile of the root region to the lift generating profile of the airfoil region.

The means for maintaining an attached flow are positioned mainly on the profiled part of the blade, i.e. the airfoil region, and optionally the transition region of the blade.

The chordwise position of the means for maintaining attached flow can be between 10% and 80% of the chord as seen from the leading edge. Alternatively, they are positioned within a region extending between 20% and 70% of the chord as seen from the leading edge. In general the means are utilised to delay separation, where a forward position, i.e. close to the leading edge, is used to delay stall, and a backward position, i.e. further away from the leading edge, is used to increase efficiency.

According to an advantageous embodiment of the wind turbine blade, the height of the channels is between 0.1% and 5% of the chord length, or alternatively between 0.2% and 3.5%, or alternatively between 0.5% and 2%. These heights effectively produce vortices of the desired size. The mentioned channel height is preferably located at the position, where the vortices are generated, i.e. immediately after the start of the second channel zone. In general, the vortices preferably correspond to the height of the channels and/or the boundary layer.

According to a preferred embodiment of the blade according to the invention, the wind turbine blade is constructed as a shell member of fibre-reinforced polymer. The channels can be formed in the surface of the wind turbine blade during the moulding process, either by forming protrusions in a negative mould, or by moulding strips of a dissolvable material in the surface of the wind turbine blade, which after moulding is dissolved in order to form the vortex generating channels. The channels can also be formed in the surface of the blade after moulding by for instance milling.

According to a second aspect, the invention also provides a wind turbine rotor comprising a number, preferably two or three, of the previously mentioned wind turbine blades. According to a third aspect, a wind turbine comprising such a wind turbine rotor or a number of such wind turbine blades is provided.

The various embodiments of the boundary layer control means of course also may be used to other flow control members, i.e. a flow control member having a flow control surface, wherein the flow control member is provided with boundary layer control means for maintaining a flow of a flowing medium attached to the exterior of the flow control member, the flow having a flow direction, wherein the boundary layer control means include: a channel submerged in the flow control surface, the channel having: a first end facing the flow of the flowing medium, a second end positioned downstream in the flow of the flowing medium from the first end, and a bottom surface extending from the first end to the second end, wherein the channel at the first end comprises a first channel zone comprising a first sub-channel having a first cross-sectional area and a second sub-channel having a second cross-sectional area, the first sub-channel and the second sub-channel crossing each other at a point of crossing.

BRIEF DESCRIPTION OF THE DRAWINGS

The invention is explained in detail below with reference to the drawings, in which.

DETAILED DESCRIPTION OF THE INVENTION

Figure 1:
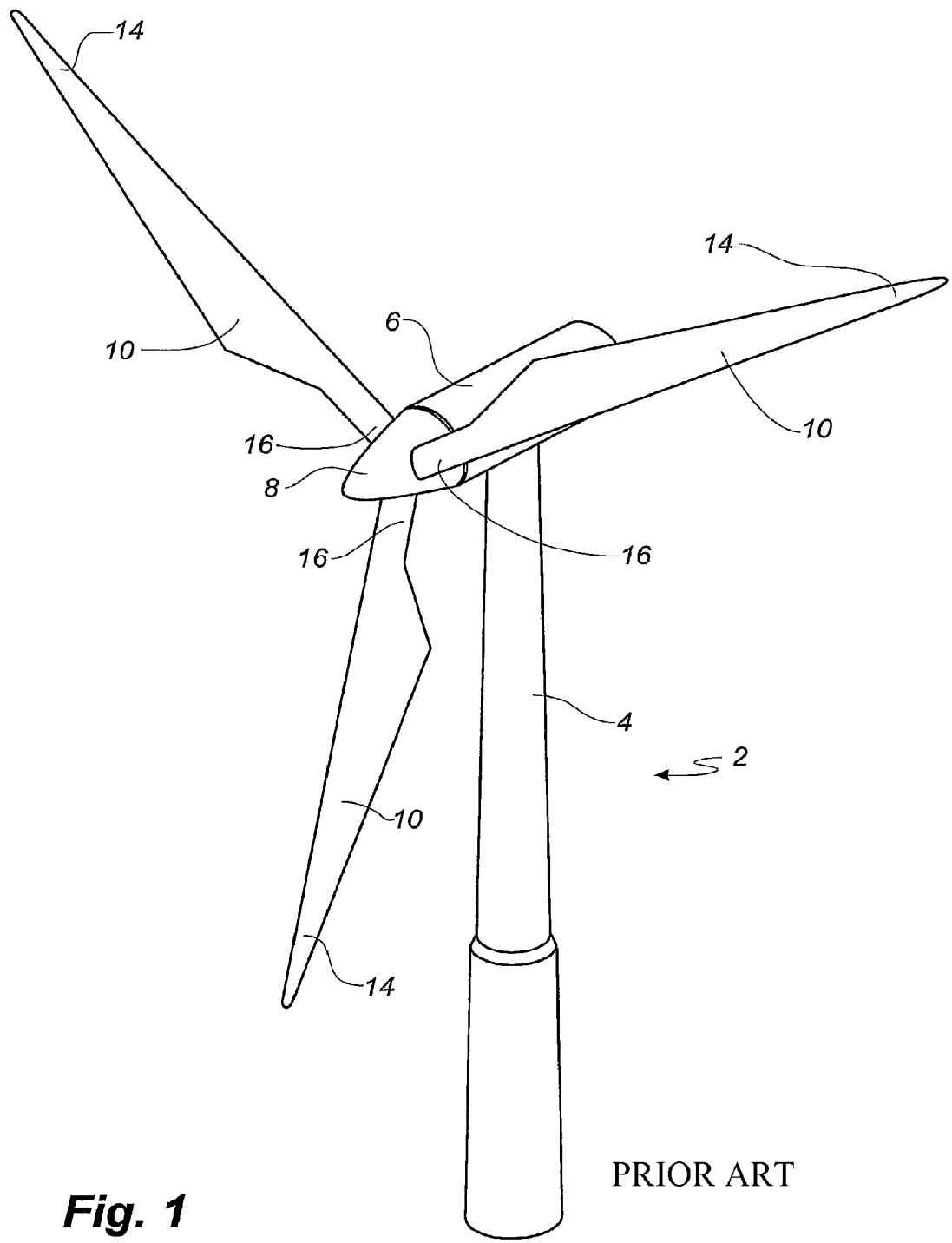
FIG. 1 shows a wind turbine, FIG. 2 a schematic view of a wind turbine blade according to the invention, FIG. 3 a first embodiment of a boundary layer control means, FIG. 4 a second embodiment of a boundary layer control means, FIG. 5 a third embodiment of a boundary layer control means, FIG. 6 a fourth embodiment of a boundary layer control means, FIG. 7 a fifth embodiment of a boundary layer control means, FIG. 8 a cross-sectional view of a channel being part of the boundary layer control means, FIG. 9 a second cross-sectional view of a channel being part of the boundary layer control means, FIG. 10 a sixth embodiment of a boundary layer control means, and FIG. 11 a seventh embodiment of a boundary layer control means.

FIG. 1 illustrates a conventional modern wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
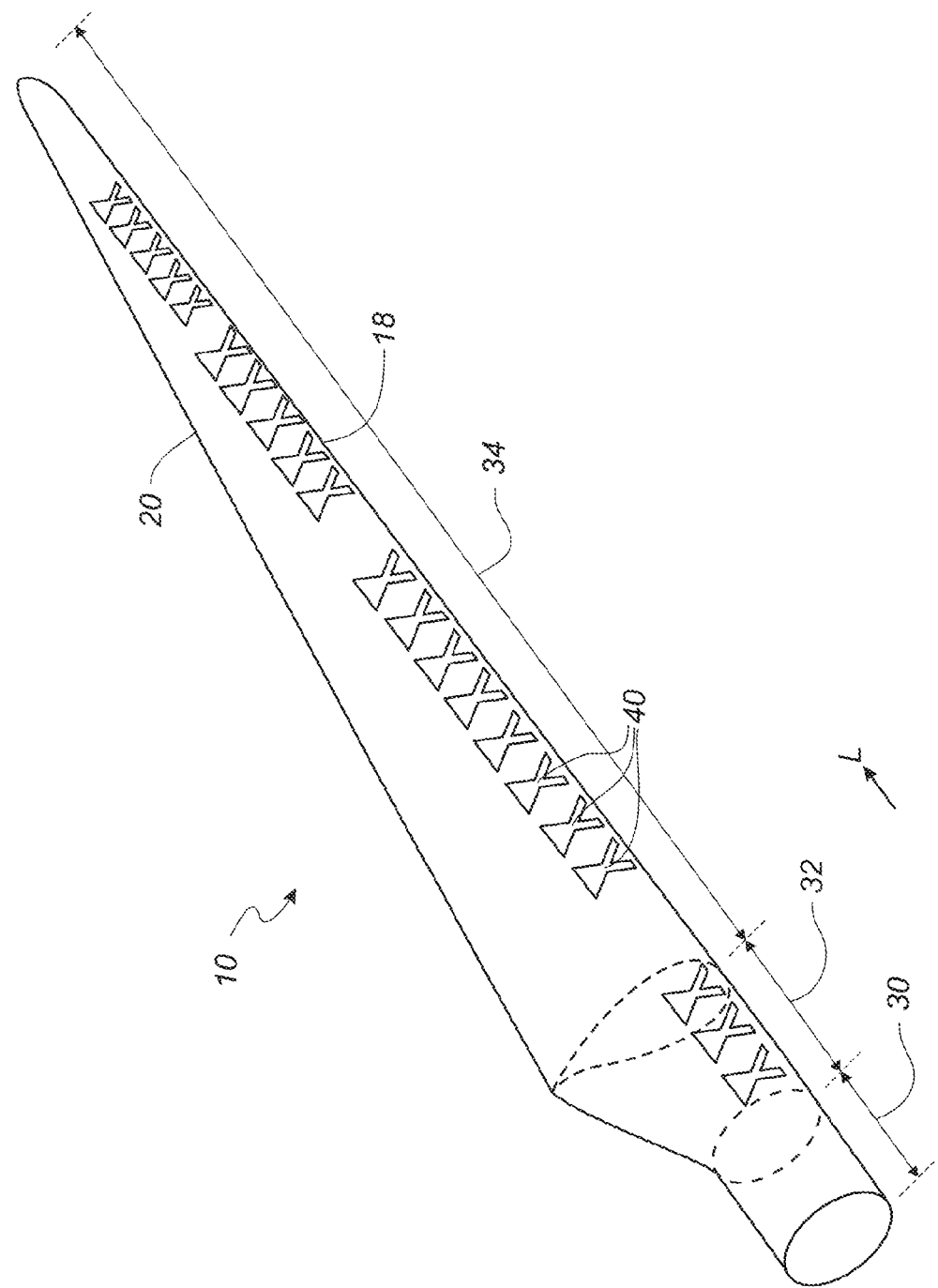

FIG. 2 shows a schematic view of an embodiment of a wind turbine according to the invention. The wind turbine blade 10 comprises a number of boundary layer control means 40 according to the invention, the means being formed as submerged channels in the surface of a suction side of the wind turbine blade 10.

The wind turbine blade 10 has the shape of a conventional wind turbine blade and comprises a root region 30 closest to the hub, a profiled or an airfoil region 34 furthest away from the hub and a transition region 32 between the root region 30 and the region area 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 has a substantially circular or elliptical cross-section, which reduces loads from wind gusts and makes it easier and safer to mount the blade 10 to the hub. The diameter of the root region 30 is typically constant along the entire root area 30. The transition region 32 has a shape gradually changing from the circular shape of the root region 30 to the airfoil profile of the airfoil region 34, optionally with an intermediate elliptical shape. The width of the transition region 32 typically increases substantially linearly with increasing distance L from the hub.

The airfoil region 34 has an airfoil profile with a chord extending between the leading edge 18 and the trailing edge 20 of the blade 10. The width of the chord decreases with increasing distance L from the hub. It should be noted that the chords of different sections of the blade do not necessarily lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The boundary layer control means 40 are arranged in arrays in the spanwise or longitudinal direction L of the blade. The sizes of the individual channels are grossly exaggerated in the figure and will normally be much smaller compared to the wind turbine blade. Thus, the wind turbine blade can comprise a much higher number of boundary layer control means 40 in the longitudinal direction L of the wind turbine blade 10.

The boundary layer control means 40 are utilised to generate vortices of turbulent flow within the channel of the boundary layer control means 40, the vortices pulling a boundary layer of a flowing medium flowing across the surface of the wind turbine blade 10 from the leading edge 18 to the trailing edge 20 towards the surface of the wind turbine blade, thus preventing the boundary layer from separating from the exterior of the wind turbine blade 10. The boundary layer control means 40 may be cascaded in the chord-wise direction (or equivalently the transverse direction) of the blade 10 in order to continuously generate vortices in the chord-wise direction L of the blade 10.

The boundary layer control means 40 can be of any of the embodiments shown in FIGS. 3-11 or combinations thereof.

Figure 3:
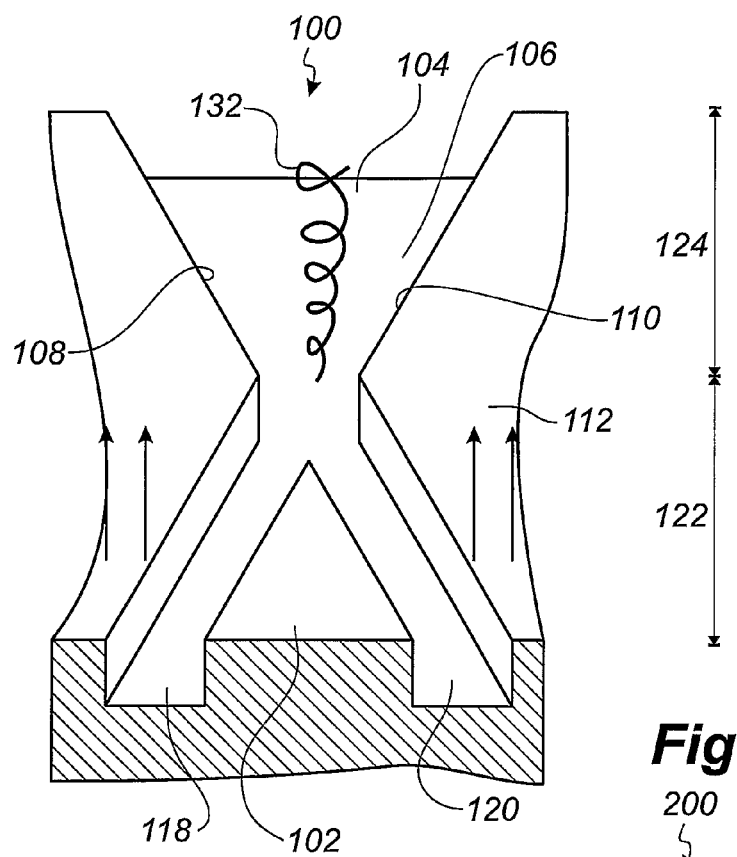

FIG. 3 shows a schematic view of a first embodiment of a boundary layer control means 100 for maintaining flow of a flowing medium attached to the exterior of a flow control member, such as a wind turbine blade, having a flow control surface 112. The boundary layer control means 100 comprises a channel, which is submerged in the flow control surface 112. The channel extends in the direction of a free flow having a flow direction, which is depicted with arrows in the figure. The channel comprises a first end 102 facing the free flow and a second end 104 positioned downstream in the flow of the flowing medium from the first end 102. The channel further comprises a bottom surface 106 extending from the first end 102 to the second end 104.

The channel comprises a first channel zone 122 at the first end 102 of the channel, and a second channel zone 124 at the second end 104 of the channel. The first channel zone 122 comprises a first sub-channel 118 and a second sub-channel 120, both of which are adapted to guide separate flows. The first sub-channel 118 and the second sub-channel and thereby also the separate guided flows cross each other at a point of crossing at a boundary between the first channel zone 122 and the second channel zone 124. Since the two separate flows have different velocity directions at the point of crossing, a set of vortices 132 is generated, which propagates through the second channel zone 124 in the flow direction. The first channel zone 122 comprises a first sub-channel 118 and a second sub-channel 120, both of which are adapted to guide separate flows.

The second channel zone comprises a first sidewall 108 extending between the flow control surface 112 and the bottom surface 106, as well as a second sidewall 110 extending between the flow control surface 112 and the bottom surface 106. The first sidewall 108 and the second sidewall 110 are diverging in the flow direction. Thus, the generated set of vortices 132 can freely propagate through the second channel zone 124. The set of vortices 132 pulls the boundary layer of a the flowing medium towards the flow control surface 112, which ensures that the boundary layer separates further downstream of the flow or is prevented entirely. If the flow control member is a wind turbine blade, this means that the overall lift of the blade can be improved.

The height of the vortices should generally correspond to the height of the channel, i.e. the distance between the bottom surface 106 and the flow control surface 112, in order to efficiently energise the boundary layer and keep the flow attached to the exterior of the flow control member.

Figure 4:
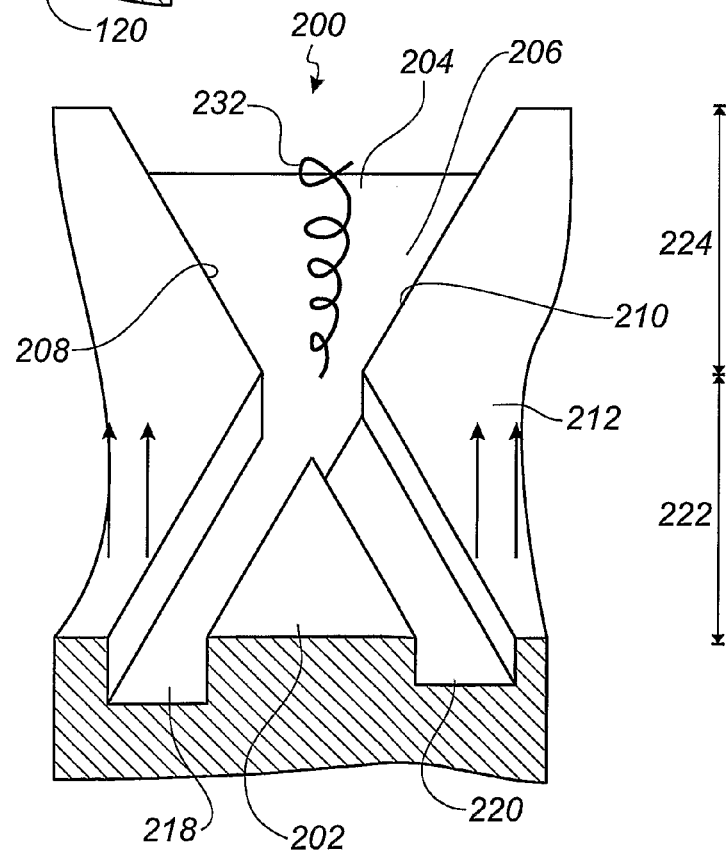

FIG. 4 shows a second embodiment of a boundary layer control means 200. In the figure like numerals refer to like parts of the first embodiment. Therefore, only the differences between the first embodiment and the second embodiment are described. The second embodiment differs from the first embodiment in that the first sub-channel 218 has a first cross-sectional area and the second sub-channel 220 has a second cross-sectional area, where the first cross-sectional area differs from the second cross-sectional area. This enhances the shear stress between the two oncoming flows at the point of crossing, thereby more effectively producing flow vortices.

Figure 5:
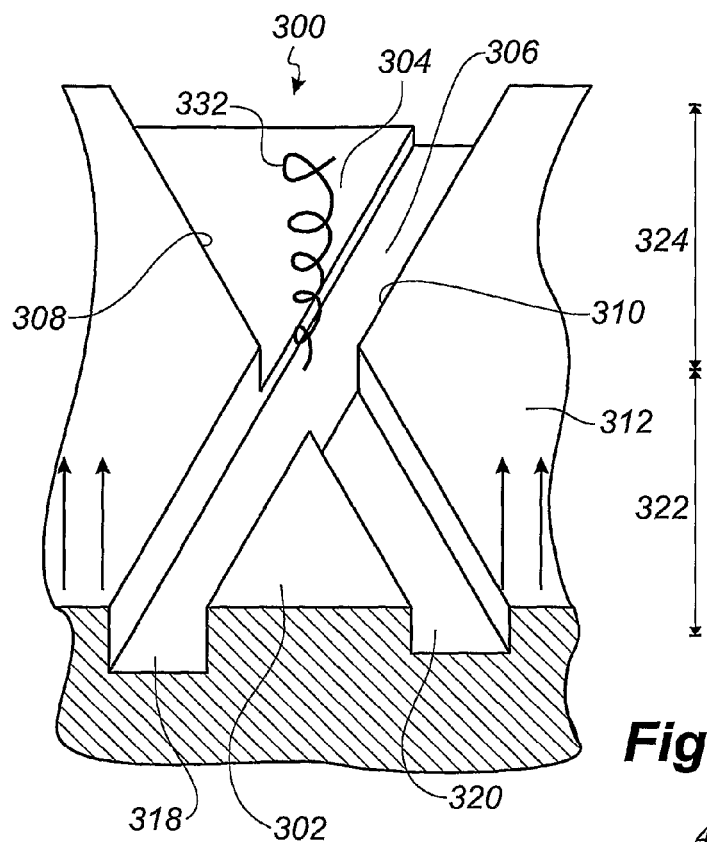

FIG. 5 shows a third embodiment of a boundary layer control means 300, where like numerals refer to like parts of the second embodiment. Therefore, only the differences between the third embodiment and the second embodiment are described. This embodiment differs from the second embodiment in that the first sub-channel 318 continues into the second channel zone 324. This sub-channel can then cross other sub-channels in order to generate new sets of vortices in order to further ensure that the boundary layer separates further downstream.

Figure 6:
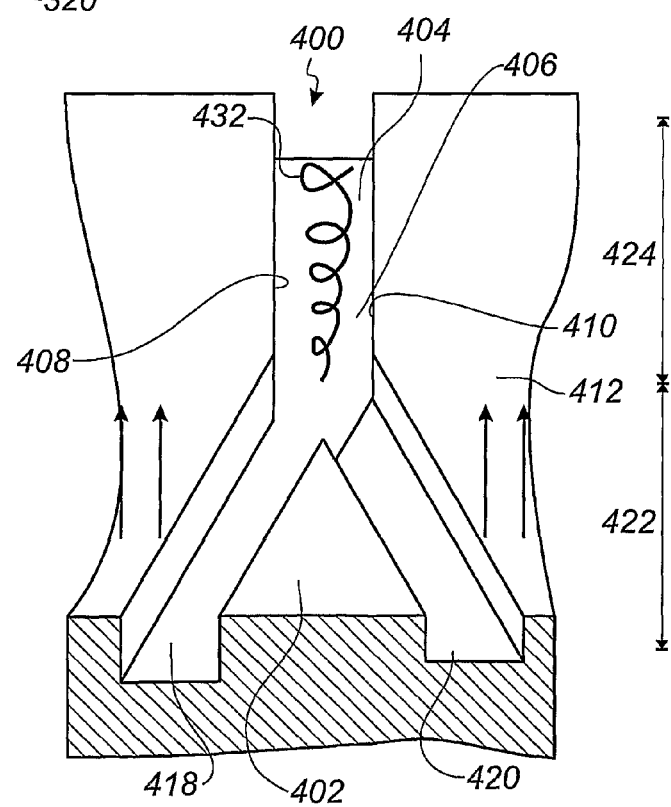

FIG. 6 shows a fourth embodiment of a boundary layer control means 400, where like numerals refer to like parts of the second embodiment. Therefore, only the differences between the fourth embodiment and the second embodiment are described. This embodiment differs from the second embodiment in that the first sidewall 408 and the second sidewall 410 are substantially parallel to the flow direction of the free flow in the second channel zone 424.

Figure 7:
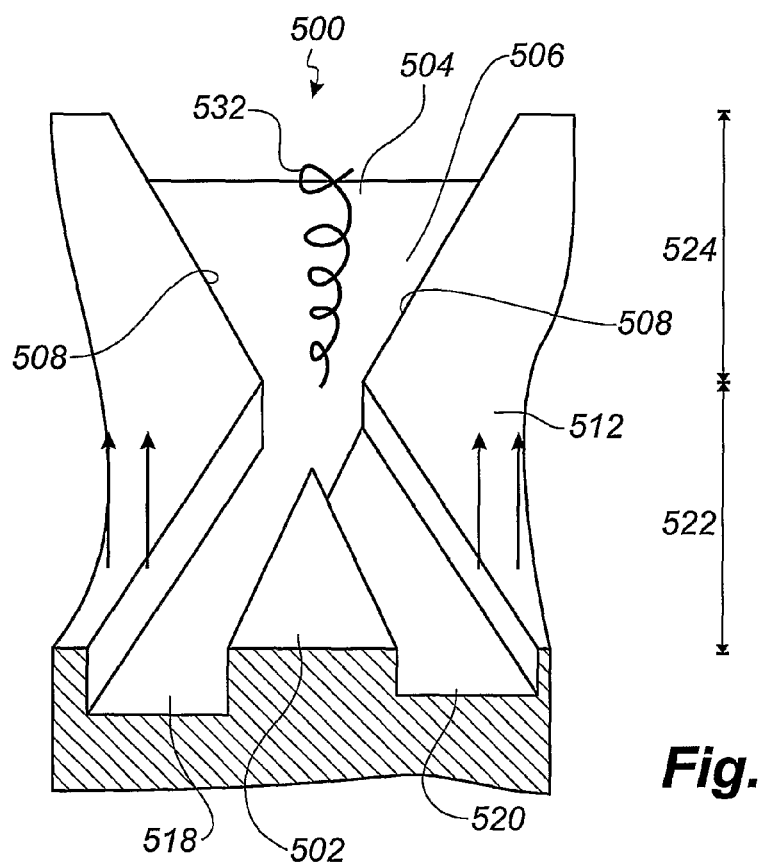

FIG. 7 shows a fifth embodiment of a boundary layer control means 500, where like numerals refer to like parts of the second embodiment. Therefore, only the differences between the fifth embodiment and the second embodiment are described. This embodiment differs from the second embodiment in that the cross-sectional areas of the first sub-channel 518 and the second sub-channel 520 are decreasing in the flow direction. Thereby, the separate flows through the sub-channels are accelerated towards the point of crossing, thereby producing stronger vortices.

Figure 8:
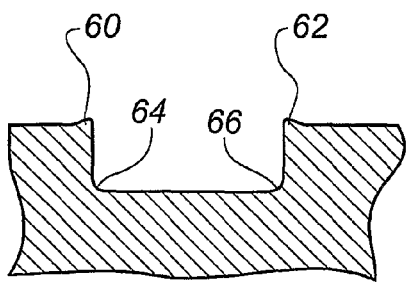
Figure 9:
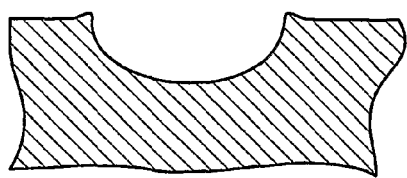

In the embodiments shown in FIGS. 3-7 sidewall edges formed between sidewalls and the flow control surface are depicted as having an angle of about 90 degrees. However, the sidewall edges can also protrude beyond the flow control surface and form lips 60, 62 above the channel as shown in FIG. 8, which depicts a cross-section of a channel according to the invention. Furthermore, a first bottom edge 64 and a second bottom edge 66 formed between the first sidewall and the bottom surface and the second sidewall and the bottom surface, respectively, can be rounded. Thus, the channel does not have any sharp edge, thereby making it easier to mould the object with the flow control surface. The bottom surface of the channel can also be even more rounded as depicted in FIG. 9.

Figure 10:
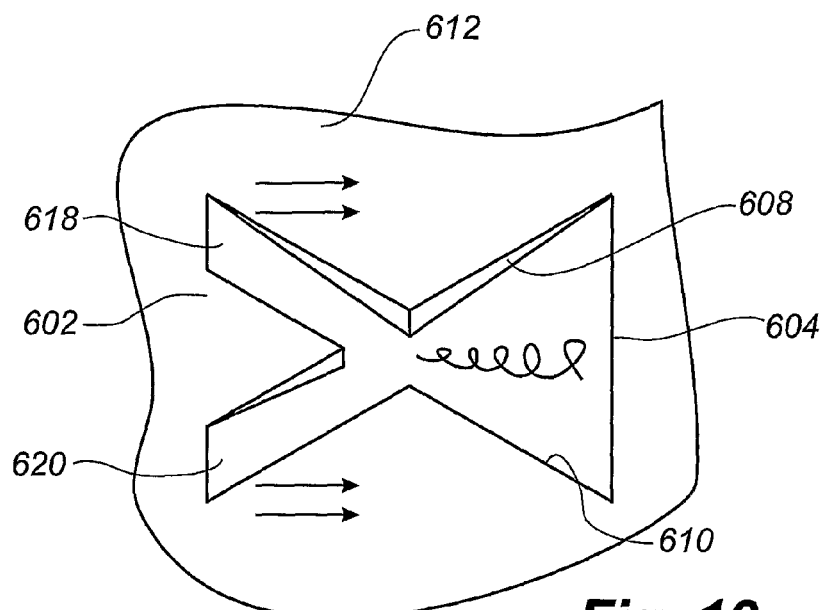

FIG. 10 shows a sixth embodiment of a boundary layer control means 600, wherein like numerals refer to like parts of the first embodiment. This embodiment differs from the first embodiment in that the height of the sidewalls of the first sub-channel 608 and the second sub-channel 610 are decreasing towards the first end 602 so that the sub-channels 618, 620 emerge at the flow control surface 612 at the first end 602. Furthermore, the height of the first sidewall 608 and the second sidewall 610 is decreasing towards the second end 604 so that the channel emerges at the flow control surface 612 at the second end 604.

The channels can also be slightly curved or bent so that they cross each other with a lower angle of attack, and where the vortices are generated by flow separating from the first sidewall 608 and the second sidewall 610.

Figure 11:
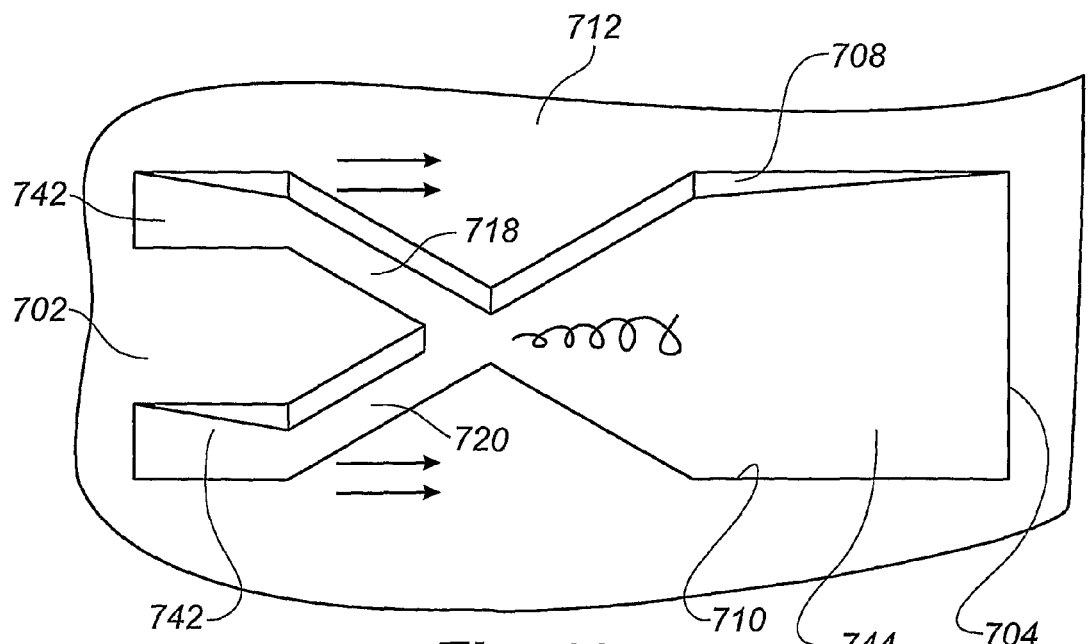

FIG. 11 shows a seventh embodiment of a boundary layer control means 700, wherein like numerals refer to like parts of the first embodiment. This embodiment differs from the first embodiment in that the first sub-channel 718 and the second sub-channel 720 are provided with inlets 742 having sidewall, which are substantially parallel to the flow direction of the free flow, which is illustrated with arrows. The height of the sidewalls is in the inlet region 742 decreasing towards the first end 702 so that the inlets 742 of the sub-channels 718, 720 emerge at the flow control surface 712 at the first end 702. Furthermore, the channel is provided with an outlet region 744 after the second channel zone, where the first sidewall 708 and the second sidewall 710 are substantially parallel to the flow direction of the free flow. The height of the sidewalls is in the outlet region 744 decreasing towards the second end 704 so that the channel emerges at the flow control surface 712 at the second end 704.

The invention has been described with reference to a preferred embodiment. However, the scope of the invention is not limited to the illustrated embodiment, and alterations and modifications can be carried out without deviating from the scope of the invention. For instance can the second channel zones of adjacent means merge into a common channel zone.

List of Reference Numerals

In the numerals, x refers to a particular embodiment. Thus, for instance 402 refers to the first end of the fourth embodiment.

2 wind turbine
4 tower
6 nacelle
8 hub
10 blade
14 blade tip
16 blade root
18 leading edge
20 trailing edge
30 root region
32 transition region
34 airfoil region
40 boundary layer control means
60, 62 lips
64 first bottom edge
66 second bottom edge
x00 boundary layer control means
x02 first end
x04 second end
x06 bottom surface
x08 first sidewall
x10 second sidewall
x12 flow control surface
x18 first sub-channel
x20 second sub-channel
x22 first channel zone
x24 second channel zone
x32 set of vortices
x42 inlet
x44 outlet

The invention claimed is:

1. A wind turbine blade (10) having a longitudinal direction with a root end (16) and a tip end (14) as well as a chord extending in a transverse direction between a leading edge (18) and a trailing edge (20), the blade (10) comprising a flow control surface with a suction side and a pressure side, characterised in that a plurality of boundary layer control means (40) is formed in the flow control surface, wherein the boundary layer control means (40) include a channel submerged in the flow control surface (112; 212; 312; 412; 512; 612; 712) with a first end facing towards the leading edge (18) and a second end facing towards the trailing edge (20) of the blade (10), the channel comprising a bottom surface (106; 206; 306; 406; 506) extending from the first end (102; 202; 302; 402; 502; 602; 702) to the second end (104; 204; 304; 404; 504; 604; 704), and wherein the channel at the first end (102; 202; 302; 402; 502; 602; 702) comprises a first channel zone (122; 222; 322; 422; 522) comprising a first sub-channel (118; 218; 318; 418; 518; 618; 718) having a first cross-sectional area and a second sub-channel (120; 220; 320; 420; 520; 620; 720) having a second cross-sectional area, the first sub-channel (118; 218; 318; 418; 518; 618; 718) and the second sub-channel (120; 220; 320; 420; 520; 620; 720) merging at a point of crossing.

2. The wind turbine blade according to claim 1, wherein the number of boundary layer control means (40) is arranged on the suction side of the blade.

3. The wind turbine blade according to claim 1, wherein the channel at the second end (104; 204; 304; 404; 504; 604; 704) comprises a second channel zone (124; 224; 324; 424; 524) having a shape so that vortices generated at the point of crossing can propagate in the transverse direction through the second channel zone (124; 224; 324; 424; 524).

4. The wind turbine blade according to claim 3, wherein the second channel zone (124; 224; 324; 424; 524) comprises a first sidewall (108; 208; 308; 408; 508; 608; 708) extending between the flow control surface (112; 212; 312; 412; 512; 612; 712) and the bottom surface (106; 206; 306; 406; 506), and a second sidewall (110; 210; 310; 410; 510; 610; 710) extending between the flow control surface (112; 212; 312; 412; 512; 612; 712) and the bottom surface (106; 206; 306; 406; 506), and wherein the first sidewall (108; 208; 308; 408; 508; 608; 708) and the second sidewall (110; 210; 310; 410; 510; 610; 710) are substantially parallel.

5. The wind turbine blade according to claim 4, wherein the first sidewall (108; 208; 308; 408; 508; 608; 708) and the second side wall is continuously connected to a sidewall of the first sub-channel (118; 218; 318; 418; 518; 618; 718) and a sidewall of the second sub-channel (120; 220; 320; 420; 520; 620; 720), respectively.

6. The wind turbine blade according to claim 3, wherein the second channel zone (124; 224; 324; 424; 524) comprises a first sidewall (108; 208; 308; 408; 508; 608; 708) extending between the flow control surface (112; 212; 312; 412; 512; 612; 712) and the bottom surface (106; 206; 306; 406; 506), and a second sidewall (110; 210; 310; 410; 510; 610; 710) extending between the flow control surface (112; 212; 312; 412; 512; 612; 712) and the bottom surface (106; 206; 306; 406; 506), and wherein the first sidewall (108; 208; 308; 408; 508; 608; 708) and the second sidewall (110; 210; 310; 410; 510; 610; 710) are diverging towards the trailing edge (18) of the blade.

7. The wind turbine blade according to claim 6, wherein the first sidewall (108; 208; 308; 408; 508; 608; 708) and the second side wall is continuously connected to a sidewall of the first sub-channel (118; 218; 318; 418; 518; 618; 718) and a sidewall of the second sub-channel (120; 220; 320; 420; 520; 620; 720), respectively.

8. The wind turbine blade according to claim 3, wherein the first channel zone (122; 222; 322; 422; 522) and the second channel zone (124; 224; 324; 424; 524) are separated by a sharp edge.

9. The wind turbine blade according to claim 1, wherein the first sub-channel and the second sub-channel cross each other at the point of crossing with an angle between 10 and 100 degrees.

10. The wind turbine blade according to claim 1, wherein the first channel zone (122; 222; 322; 422; 522) and the second channel zone (124; 224; 324; 424; 524) are separated by a sharp edge.

11. The wind turbine blade according to claim 1, wherein the first cross-sectional area is substantially the same as the second cross-sectional area.

12. The wind turbine blade according to claim 1, wherein the first cross-sectional area is different from the second cross-sectional area.

13. The wind turbine blade according to claim 1, wherein the second channel zone comprises a first additional sub-channel and/or a second additional sub-channel.

14. The wind turbine blade according to claim 1, wherein the first cross-sectional area and/or the second cross-sectional area is decreasing towards the trailing edge (18) of the blade.

15. The wind turbine blade according to claim 1, wherein a height of the channels is between 0.1% and 5% of the chord length.

16. The wind turbine blade according to claim 1, wherein the blade is divided into:
a root region (30) with a substantially circular or elliptical profile closest to the root end,
an airfoil region (34) with a lift generating profile furthest away from the root end and closest to the tip end, and
a transition region (32) between the root region (30) and the airfoil region (34), the profile of the transition region (32) gradually changing in the radial direction from the circular or elliptical profile of the root region to the lift generating profile of the airfoil region.

17. The wind turbine blade according to claim 16, wherein the plurality of boundary layer control means (40) is provided in the airfoil region (34) only.

18. The wind turbine blade according to claim 16, wherein the plurality of boundary layer control means (40) is provided in the airfoil region (34) and the transition region (32).

19. A wind turbine rotor comprising two of the wind turbine blades according to claim 1.

20. A wind turbine comprising a wind turbine rotor according to claim 19.

21. A wind turbine comprising a number of blades according to claim 1.

22. The wind turbine blade according to claim 1, wherein a height of the channels is between 0.2% and 3.5%.

23. The wind turbine blade according to claim 1, wherein a height of the channels is between 0.5% and 2%.

24. The wind turbine blade according to claim 1, wherein the first sub-channel and the second sub-channel cross each other at the point of crossing with an angle between 20 and 95 degrees.

25. The wind turbine blade according to claim 1, wherein the first sub-channel and the second sub-channel cross each other at the point of crossing with an angle 25 and 90 degrees.

26. A wind turbine rotor comprising three of the wind turbine blades according to claim 1.

* * * * *